United States Patent
Tamagawa (10) Patent No.: US 12,135,548 B2
(45) Date of Patent: Nov. 5, 2024

(54) REMOTE OPERATING DEVICE, REMOTE OPERATING SYSTEM, STEERING INFORMATION DISPLAY METHOD, AND NON-TRANSITORY STORAGE MEDIUM

(71) Applicant: TOYOTA JIDOSHA KABUSHIKI KAISHA, Toyota (JP)

(72) Inventor: Shuichi Tamagawa, Kitanagoya (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 259 days.

(21) Appl. No.: 17/870,273

(22) Filed: Jul. 21, 2022

(65) Prior Publication Data

US 2023/0091177 A1   Mar. 23, 2023

(30) Foreign Application Priority Data

Sep. 17, 2021   (JP) ................. 2021-152141

(51) Int. Cl.
G05D 1/00   (2024.01)
(52) U.S. Cl.
CPC ................. *G05D 1/0038* (2013.01)
(58) Field of Classification Search
CPC ................................. G05D 1/0038
See application file for complete search history.

(56) References Cited

U.S. PATENT DOCUMENTS

| | | | |
|---|---|---|---|
| 11,314,247 B2 * | 4/2022 | Biehler | G05D 1/0038 |
| 2018/0231982 A1 * | 8/2018 | Yunoki | G05D 1/0061 |
| 2019/0302761 A1 * | 10/2019 | Huang | G05D 1/0221 |
| 2020/0004240 A1 * | 1/2020 | Biehler | G05D 1/0038 |
| 2020/0341470 A1 * | 10/2020 | Maeda | G01C 21/3822 |
| 2021/0197808 A1 * | 7/2021 | Maeda | B60W 60/005 |
| 2022/0275604 A1 * | 9/2022 | Igarashi | G05D 1/0022 |

FOREIGN PATENT DOCUMENTS

| | | |
|---|---|---|
| JP | H08272439 A | 10/1996 |
| JP | 2011-070311 A | 4/2011 |
| JP | 2017-107374 A | 6/2017 |
| JP | 2020-155936 A | 9/2020 |

* cited by examiner

*Primary Examiner* — Peter D Nolan
*Assistant Examiner* — Mikko Okechukwu Obioha
(74) *Attorney, Agent, or Firm* — Oliff PLC (57) ABSTRACT

A remote operating device including a steering unit configured to steer a mobile body, a display unit configured to display steering information, and a control unit. The control unit includes a memory and a processor coupled to the memory. The processor is configured to receive actual steering information regarding the mobile body, acquire steering information for steering the steering unit, determine a difference between the actual steering information regarding the mobile body and the steering information for steering the steering unit, and cause the steering information for steering the steering unit and the actual steering information regarding the mobile body to be displayed on the display unit based on the difference.

6 Claims, 8 Drawing Sheets

REMOTE OPERATING DEVICE, REMOTE OPERATING SYSTEM, STEERING INFORMATION DISPLAY METHOD, AND NON-TRANSITORY STORAGE MEDIUM

CROSS-REFERENCE TO RELATED APPLICATION

This application is based on and claims priority under 35 USC 119 from Japanese Patent Application No. 2021-152141 filed on Sep. 17, 2021, the disclosure of which is incorporated by reference herein.

BACKGROUND

Technical Field

The present disclosure relates to a remote operating device, a remote operating system, a steering information display method, and a non-transitory storage medium.

Related Art

Remote piloting systems such as that disclosed in Japanese Patent Application Laid-Open (JP-A) No. 2017-107374 are known. Such remote piloting systems include a mobile body, and a remote piloting device enabling the mobile body to be piloted from externally to the mobile body.

However, in a remote operating system in which a mobile body is remotely operated from a pilot seat provided externally to the mobile body, due to a communication lag between the pilot seat and the mobile body, there is a lapse between a steering timing by an operator in the pilot seat and a steering timing in the mobile body that is actually traveling.

It is therefore hard for the operator to ascertain the relationship between their steering in the pilot seat and movement of the actual mobile body. The operator might make unnecessary steering adjustments with respect to the mobile body as a result, such that the behavior of the mobile body becomes unstable.

SUMMARY

The present disclosure obtains a remote operating device and a remote operating system in which an operator remotely operating a mobile body is able to easily and accurately ascertain movement of the actual mobile body during steering.

A remote operating device according to a first aspect includes a steering unit configured to steer a mobile body, a display unit configured to display steering information, and a control unit. The control unit includes a reception section configured to receive actual steering information regarding the mobile body, an acquisition section configured to acquire steering information for steering the steering unit, a difference determination section configured to determine a difference between the actual steering information regarding the mobile body and the steering information for steering the steering unit, and a display instruction section configured to cause the steering information for steering the steering unit and the actual steering information regarding the mobile body to be displayed on the display unit based on the difference.

In the first aspect, the steering information for steering the steering unit and the steering information regarding the actual mobile body received by the reception section are displayed on the display unit. Thus, even when there is a lapse between a steering timing by an operator in a pilot seat and a steering timing in the mobile body that is actually traveling due to a communication lag between the pilot seat and the mobile body, the operator remotely operating the mobile body can readily accurately ascertain movement of the actual mobile body during steering by viewing the respective steering information displayed on the display unit.

A remote operating device according to a second aspect is the remote operating device according to the first aspect, wherein the steering information for steering the steering unit is a first trajectory line, and the actual steering information regarding the mobile body received by the reception section is a second trajectory line.

In the second aspect, the steering information for steering the steering unit is the first trajectory line, and the steering information regarding the actual mobile body received by the reception section is the second trajectory line. Thus, the operator remotely operating the mobile body can readily intuitively and accurately ascertain the movement of the actual mobile body during steering, compared to cases in which the respective steering information does not take the form of lines.

A remote operating device according to a third aspect is the remote operating device according to the second aspect, wherein a display format of the first trajectory line and the second trajectory line is changed in cases in which an overlap amount of the first trajectory line and the second trajectory line is a threshold or greater.

In the third aspect, the display format of the first trajectory line and the second trajectory line is changed in cases in which the overlap amount of the first trajectory line and the second trajectory line is the threshold or greater. The operator remotely operating the mobile body can therefore readily intuitively and accurately ascertain the movement of the actual mobile body during steering, compared to cases in which the display format of the first trajectory line and the second trajectory line is not changed.

A remote operating system according to a fourth aspect includes the remote operating device of any one of the first aspect to the third aspect, and a mobile body configured to be remotely operated by the remote operating device.

In the fourth aspect, the remote operating device that remotely operates the mobile body includes the display unit that displays the steering information for steering the steering unit and the steering information regarding the actual mobile body received by the reception section. Thus, even when there is a lapse between the steering timing by the operator in the pilot seat and the steering timing in the mobile body that is actually traveling due to a communication lag between the pilot seat and the mobile body, the operator remotely operating the mobile body can readily accurately ascertain the movement of the actual mobile body during steering by viewing the respective steering information displayed on the display unit.

As described above, in the present disclosure, the operator remotely operating the mobile body is able to easily and accurately ascertain the movement of the actual mobile body during steering.

BRIEF DESCRIPTION OF THE DRAWINGS

Exemplary embodiments of the present invention will be described in detail based on the following figures, wherein.

DETAILED DESCRIPTION

Figure 1:
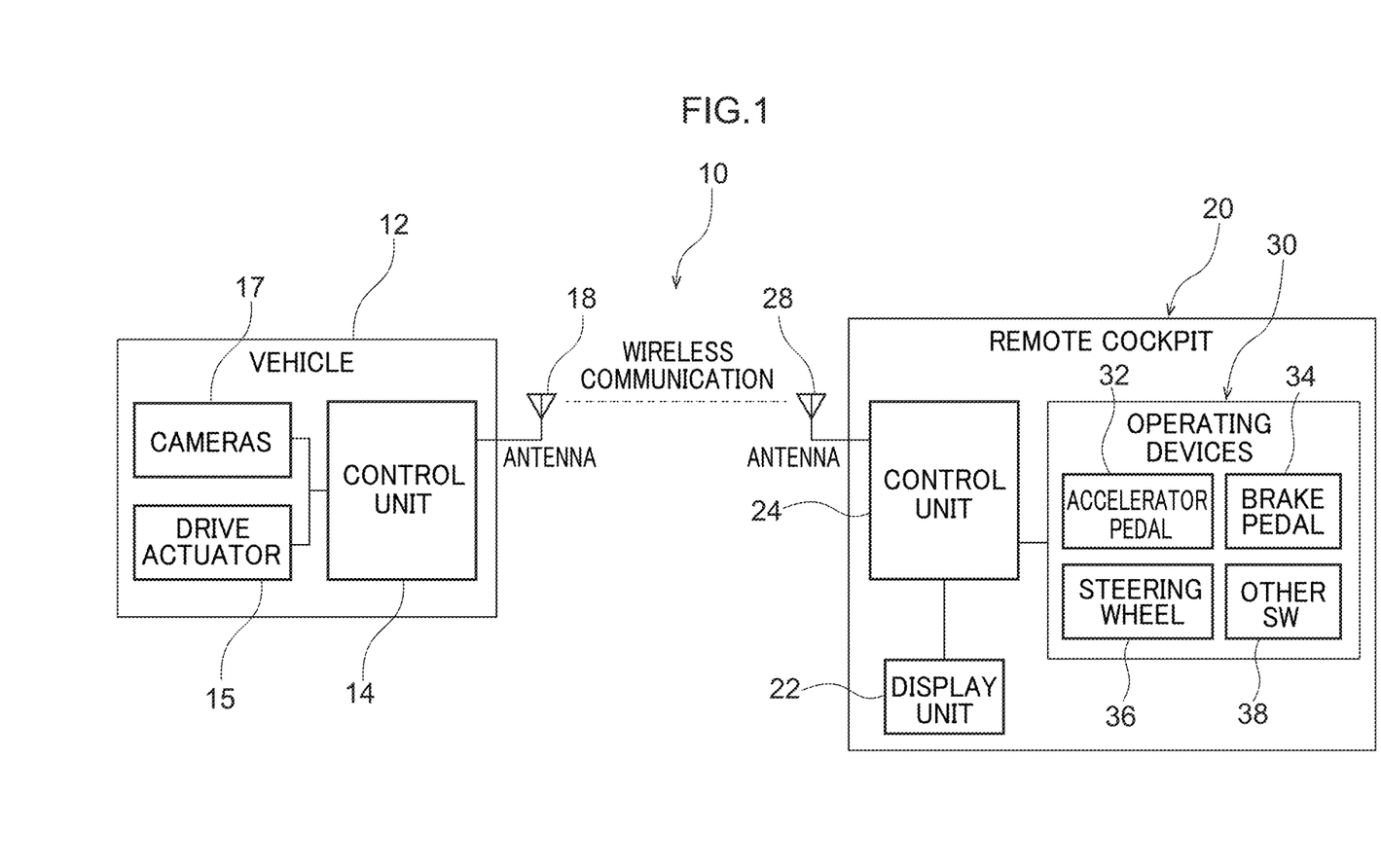
FIG. 1 is a block diagram illustrating a schematic configuration of a remote operating system according to an exemplary embodiment.

Detailed explanation follows regarding an exemplary embodiment according to the present disclosure, with reference to the drawings. As illustrated in FIG. 1, a remote operating system 10 according to the present exemplary embodiment includes a vehicle 12 serving as an example of a mobile body, and a remote cockpit 20 serving as a remote operating device including a pilot seat in which a driver (operator) sits in order to drive the vehicle 12 by remote operation externally to the vehicle 12.

Figure 7:
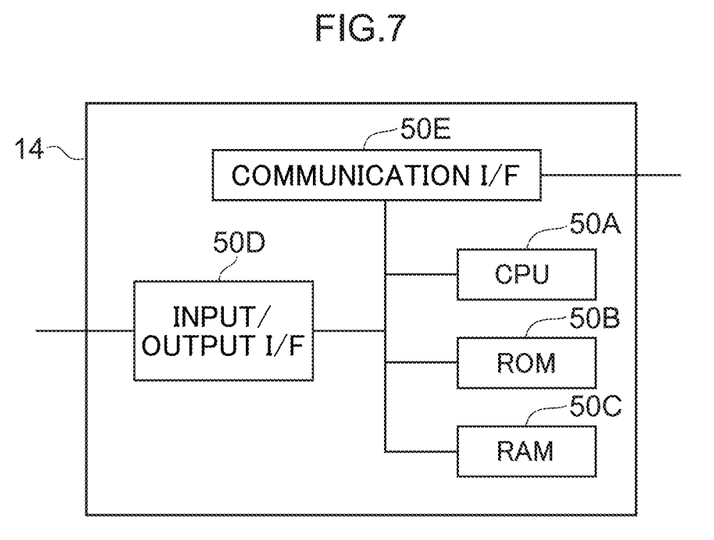
FIG. 7 is a block diagram illustrating a hardware configuration of a control unit of a vehicle according to an exemplary embodiment.

The vehicle 12 includes a control unit 14 that is electrically connected to a drive actuator 15. FIG. 7 is a block diagram illustrating a hardware configuration of the control unit 14. As illustrated in FIG. 7, the control unit 14 is configured as a microcomputer including a central processing unit (CPU) 50A serving as a processor, read only memory (ROM) 50B and random access memory (RAM) 50C serving as a memory, an input/output I/F 50D, a communication I/F 50E, and so on. The CPU 50A reads a program from the ROM 50B and executes the program with the RAM 50C serving as a workspace. By doing so, the control unit 14 receives operating instructions (control data) transmitted from the remote cockpit 20, and drives the drive actuator 15, operates an accelerator pedal (travels), operates a steering wheel (steers), operates a brake pedal (stops), and so on based on these operating instructions, so as to control actual driving.

The control unit 14 included in the vehicle 12 also includes the communication I/F 50E, this being an interface that receives the operating instructions (control data) from the remote cockpit 20 through an antenna 18 and transmits steering information required for remote driving to the remote cockpit 20.

The vehicle 12 also includes cameras 17 that capture pictures of the surroundings of the vehicle 12. The cameras 17 are provided at plural suitable positions on the vehicle 12. Note that the steering information required for remote driving that is transmitted by the communication I/F 50E includes pictures (image data) captured by the cameras 17. The cameras 17 are also electrically connected to the control unit 14.

The remote cockpit 20 includes a control unit 24. The control unit 24 includes a communication I/F 60E, this being an interface that receives the steering information required for remote driving from the communication I/F 50E through an antenna 28 and transmits the operating instructions (control data) from the remote cockpit 20 to the communication I/F 50E. The communication I/F 60E of the control unit 24 serves as functional configuration that receives the steering information from the vehicle 12, and is an example of a reception section.

The remote cockpit 20 also includes a display unit 22 that displays actual steering information received by the communication I/F 60E, such as pictures captured by the plural cameras 17 provided to the vehicle 12. The display unit 22 is configured of plural displays, an LED device, and so on, and also displays various meters indicating states of the vehicle 12, such as a speedometer 40 (see FIG. 2 to FIG. 4) indicating the speed of the vehicle 12.

Namely, as well as displaying various meters such as the speedometer 40, the display unit 22 is capable of displaying a state of the vehicle 12, such as traveling or stationary, and is capable of visually notifying the driver of the state of the vehicle 12 when actually traveling along a road. Steering information for steering a steering wheel 36, described later, is also displayed on the display unit 22.

Figure 8:
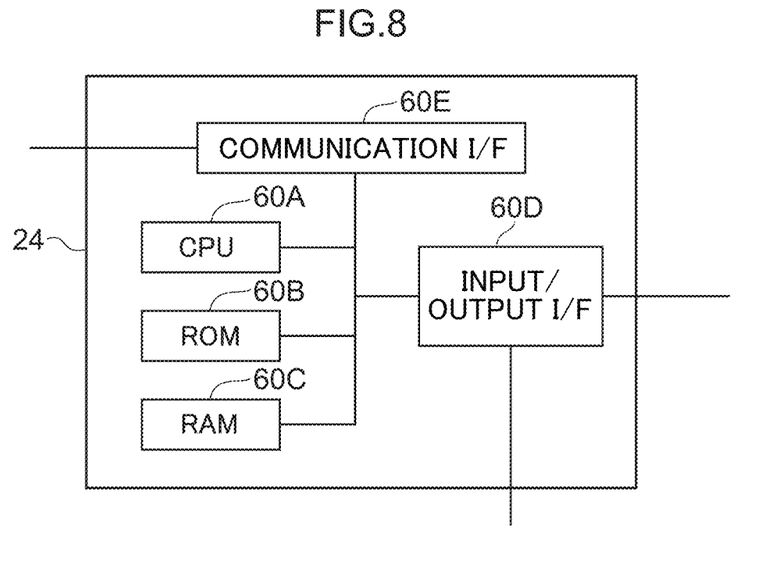
FIG. 8 is a block diagram illustrating a hardware configuration of a control unit of a remote cockpit according to an exemplary embodiment.

The remote cockpit 20 includes the control unit 24 that is electrically connected to the display unit 22. FIG. 8 is a block diagram illustrating a hardware configuration of the control unit 24. As illustrated in FIG. 8, the control unit 24 is configured as a microcomputer including a central processing unit (CPU) 60A serving as a processor, read only memory (ROM) 60B and random access memory (RAM) 60C serving as a memory, an input/output I/F 60D, the communication I/F 60E, and so on. The CPU 60A reads a program from the ROM 60B and executes the program with the RAM 60C serving as a workspace. By doing so, the control unit 24 controls the remote cockpit 20 by sending operating instructions (control data) from the remote cockpit 20 to the vehicle 12, receiving steering information required for remote driving from the vehicle 12, displaying the steering information on the display unit 22, and so on.

The control unit 24 is electrically connected to operating devices 30 for driving the vehicle 12. The operating devices 30 include an accelerator pedal 32 for accelerator operation, a brake pedal 34 for brake operation, the steering wheel 36 for steering operation, and various switches (SW) 38 for other required operations by the driver.

Namely, the control unit 24 transmits various actual driving operations and so on by the driver in the remote cockpit 20 to the vehicle 12 through the communication I/F 60E. Note that the steering wheel 36 is an example of a steering unit that steers the vehicle 12. The steering wheel 36 also employs steer-by-wire technology (an electronic control steering mechanism) to obtain steering feedback (steering reaction force) for the driver.

Explanation now follows regarding the steering information displayed on the display unit 22.

Figure 2:
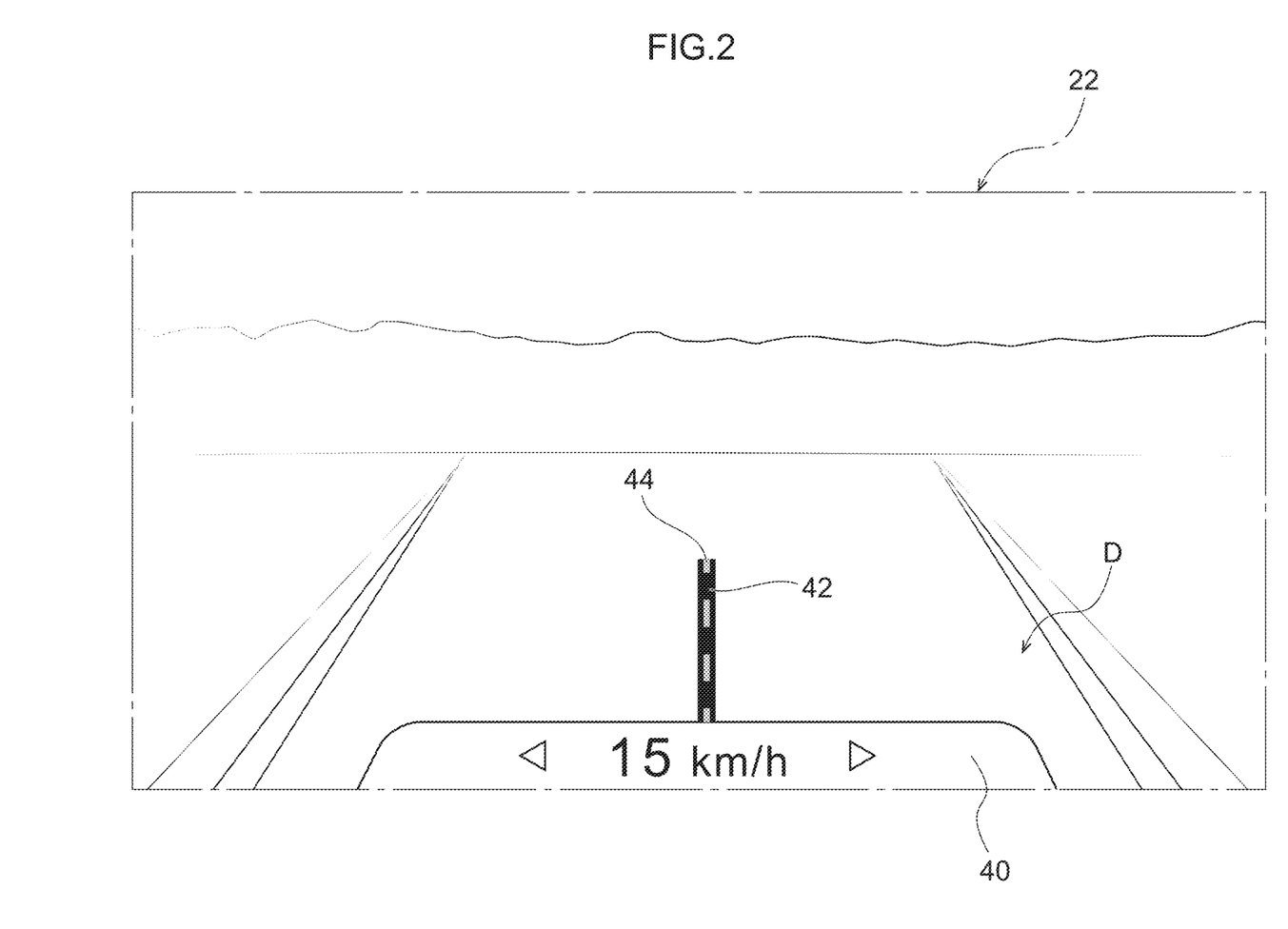
FIG. 2 is an explanatory diagram illustrating a first trajectory line and a second trajectory line displayed on a display unit of a remote operating system according to an exemplary embodiment when traveling straight ahead.
Figure 3:
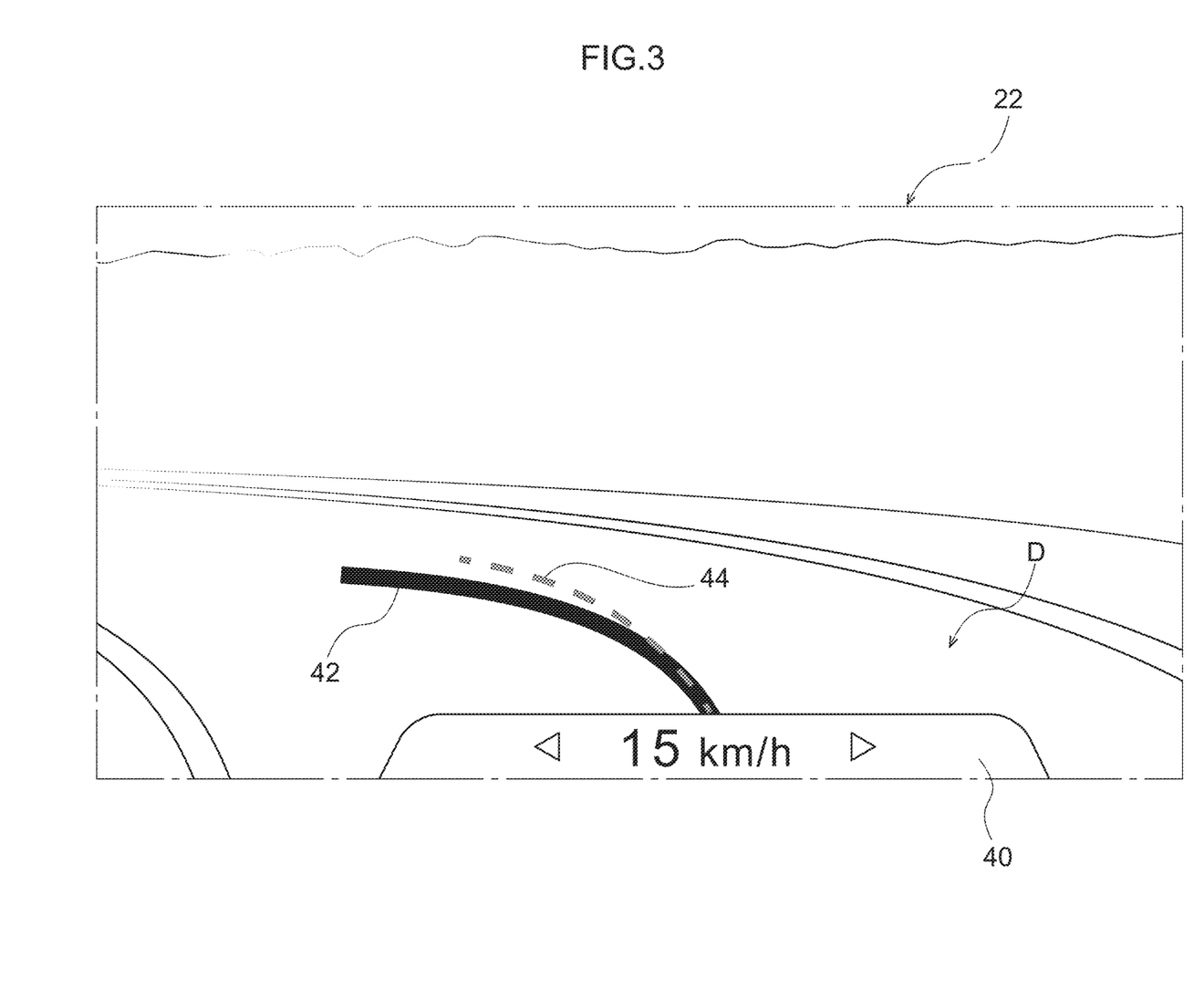
FIG. 3 is an explanatory diagram illustrating a first trajectory line and a second trajectory line displayed on a display unit of a remote operating system according to an exemplary embodiment when starting to travel along a left curve.
Figure 4:
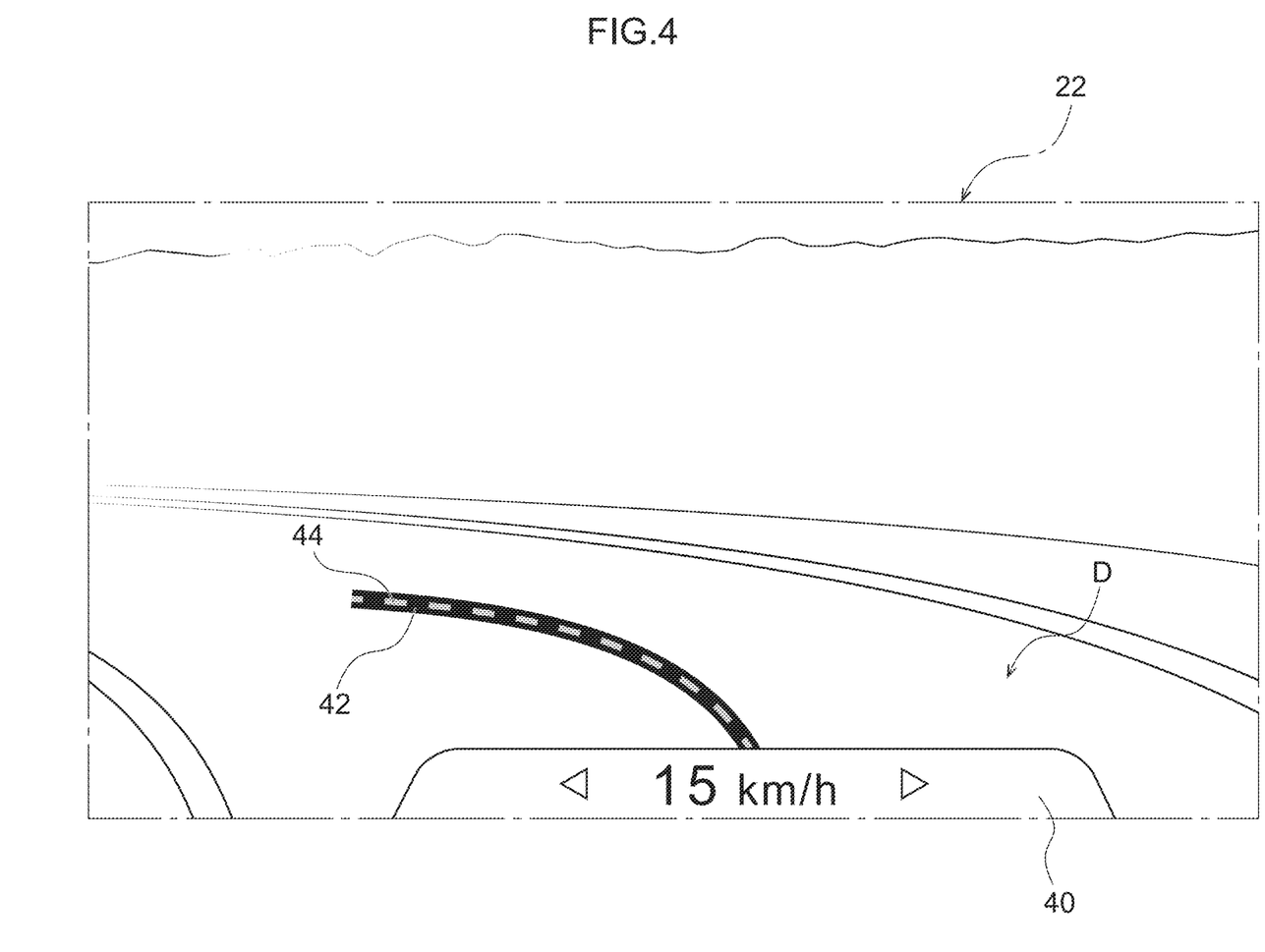
FIG. 4 is an explanatory diagram illustrating a first trajectory line and a second trajectory line displayed on a display unit of a remote operating system according to an exemplary embodiment when ending travel along a left curve.

As illustrated in FIG. 2 to FIG. 4, a road D along which the vehicle 12 is traveling is displayed on the display unit 22. A first trajectory line 42, this being a predicted trajectory indicating a direction in which the vehicle 12 should proceed, and a second trajectory line 44, this being a predicted trajectory line when the vehicle 12 actually travels, are displayed superimposed on a road width direction central position of the road D. Namely, the first trajectory line 42 is steering information for steering the steering wheel 36, whereas the second trajectory line 44 is steering information regarding the actual vehicle 12 received by the communication I/F 60E.

The first trajectory line 42 is illustrated as a solid line with a predetermined length and a thicker width than the second trajectory line 44, and is displayed on the display unit 22 so as to morph into a straight line or a curved line according to the local state of the road D along which the vehicle 12 is proceeding. The second trajectory line 44 is illustrated as a dashed line with a predetermined length and a thinner width than the first trajectory line 42, and is displayed on the display unit 22 so as to morph into a straight line or a curved line in coordination with the steering amount of the actual vehicle 12 according to the steering amount of the steering wheel 36 as it follows the first trajectory line 42.

To explain more specifically, the first trajectory line 42 and the second trajectory line 44 are the same length. As illustrated in FIG. 2, when the vehicle 12 is traveling along a straight road D, the first trajectory line 42 is a straight line, and so the driver sets the steering wheel 36 to a neutral position following this straight line. As a result, the second trajectory line 44 is a straight line, and the second trajectory line 44 overlaps the first trajectory line 42. However, when the vehicle 12 is traveling along a road D that curves toward the left as illustrated in FIG. 3, the first trajectory line 42 is a curved line that curves toward the left, and the driver steers the steering wheel 36 toward the left from its neutral position so as to follow this curved line. Although the second trajectory line 44 is also a leftward-curving curved line, the first trajectory line 42 curves at an earlier stage than the second trajectory line 44 due to a communication lag. After a predetermined duration (such as 0.2 seconds) has elapsed, the second trajectory line 44 catches up so as to overlap the first trajectory line 42 as illustrated in FIG. 4.

Note that the first trajectory line 42 and the second trajectory line 44 are illustrated as different lines in order to facilitate understanding that they are overlapping. Thus not only the line type and line width as described above, but also the line color, line darkness, and so on of the first trajectory line 42 and the second trajectory line 44 may be different from one another. The line type, line width, line color, and so on of the first trajectory line 42 and the second trajectory line 44 may be preset by the driver, or automatically set by the control unit 24.

Moreover, a display format of the first trajectory line 42 and the second trajectory line 44 may be changed in cases in which an overlap amount of the first trajectory line 42 and the second trajectory line 44 is a threshold or greater. For example, in cases in which the first trajectory line 42 is blue and the second trajectory line 44 is red, and the width of the second trajectory line 44 overlaps the width of the first trajectory line 42 by 50% or greater, this overlapping portion may be displayed in purple, or may be displayed in a completely different color.

Furthermore, in cases in which the width of the second trajectory line 44 overlaps the width of the first trajectory line 42 by 80% or greater, rather than displaying the two lines as overlapping lines, the two lines may be displayed as a single line with a completely different line type, line width, and line color. Note that the overlap amount thresholds for the first trajectory line 42 and the second trajectory line 44 are not limited to 50% and 80% as described above, and are set as appropriate by the driver or the control unit 24.

Next, explanation follows regarding operation of the remote cockpit 20 and the remote operating system 10 according to the present exemplary embodiment configured as described above.

Figure 6A:
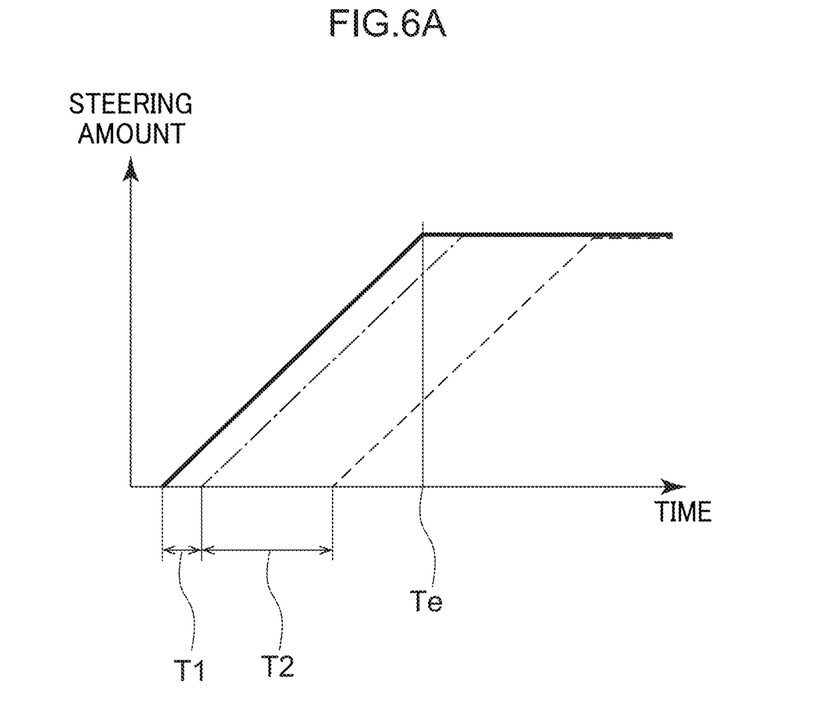
FIG. 6A is a graph illustrating lapses between a steering timing in a remote cockpit of a remote operating system according to an exemplary embodiment, a steering timing in a vehicle, and pictorial feedback being displayed on a display unit, caused by communication lag.
Figure 6B:
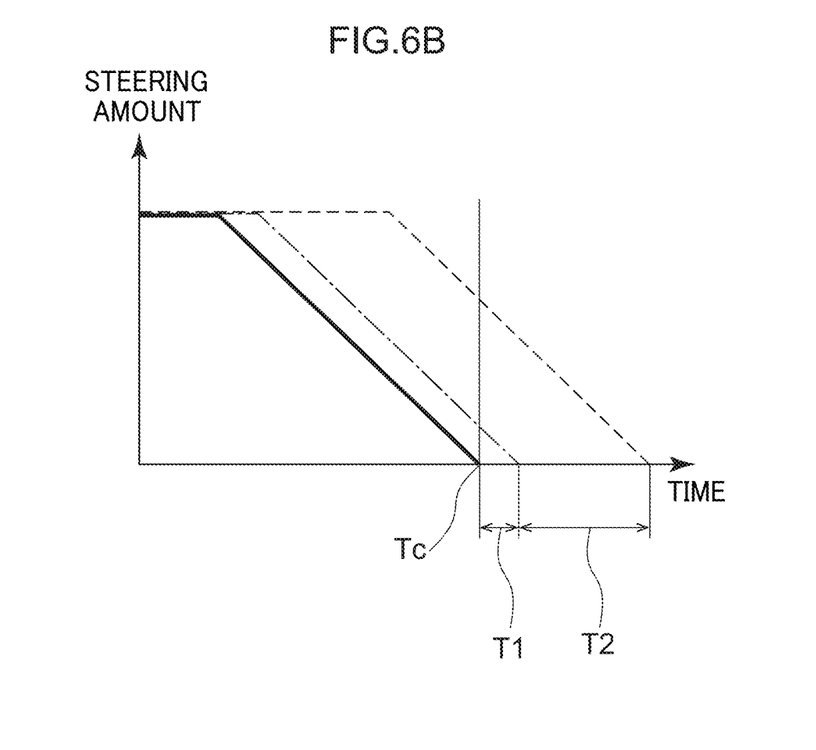
FIG. 6B is a graph illustrating lapses between a steering timing in a remote cockpit of a remote operating system according to an exemplary embodiment, a steering timing in a vehicle, and pictorial feedback being displayed on a display unit, caused by communication lag.

In FIG. 6A and FIG. 6B, the steering amount of the steering wheel 36 in the remote cockpit 20 plotted against time is illustrated by a solid line, whereas the steering amount of the steering wheel in the vehicle 12 plotted against time is illustrated by a single-dotted dashed line. Also in FIG. 6A and FIG. 6B, pictorial feedback of the steering wheel in the vehicle 12 is illustrated by a dashed line. Note that the pictorial feedback is displayed on the display unit 22.

As illustrated in FIG. 6A, due to the communication lag between the remote cockpit 20 and the vehicle 12, a steering timing of the steering wheel in the vehicle 12 from its neutral position is delayed by a duration T1 compared to a steering timing of the steering wheel 36 in the remote cockpit 20 from its neutral position. Namely, the duration T1 is a duration lasting until steering of the steering wheel 36 in the remote cockpit 20 is reflected as steering of the steering wheel in the vehicle 12.

Since the image data is greater in volume than the control data, due to the resulting communication lag, the pictorial feedback (indicating the steering timing from the neutral position) for the steering wheel in the vehicle 12 displayed on the display unit 22 in the remote cockpit 20 is delayed by a duration T2 compared to the steering timing of the steering wheel in the actual vehicle 12 from its neutral position. Namely, the duration T2 is a duration lasting until the steering of the steering wheel in the vehicle 12 is reflected as pictorial feedback.

Thus, even when steering of the steering wheel 36 in the remote cockpit 20 is complete (even when the steering wheel 36 in the remote cockpit 20 reaches the steering amount indicated at a timing Te), the steering of the steering wheel in the vehicle 12 depicted in the pictorial feedback displayed on the display unit 22 is still in a partial state (a steering amount of the steering wheel in the vehicle 12 depicted in the pictorial feedback at the timing Te has not yet reached the steering amount of the steering wheel 36 in the remote cockpit 20).

Namely, a duration lasting both the duration T1 and the duration T2 is required for the steering of the steering wheel 36 in the remote cockpit 20 to be reflected as pictorial feedback. Thus, if the driver in the remote cockpit 20 were to see the pictorial feedback displayed on the display unit 22, the driver might want to steer the steering wheel 36 further, such that the behavior of the actual vehicle 12 would become unstable.

Similar applies when the steering wheel 36 in the remote cockpit 20 is returned to its neutral position. Namely, as illustrated in FIG. 6B, due to the communication lag between the remote cockpit 20 and the vehicle 12, a steering timing of the steering wheel in the vehicle 12 to its neutral position is delayed by the duration T1 compared to a steering timing of the steering wheel 36 in the remote cockpit 20 to its neutral position.

Since the image data is greater in volume than the control data, due to the resulting communication lag, the pictorial feedback (indicating the steering timing to the neutral position) for the steering wheel in the vehicle 12 displayed on the display unit 22 of the remote cockpit 20 is delayed by the duration T2 compared to the steering timing of the steering wheel in the actual vehicle 12 to its neutral position.

Thus, even when the steering of the steering wheel 36 in the remote cockpit 20 is complete as far as its neutral position (even when the steering wheel 36 in the remote cockpit 20 has reached its neutral position as indicated at a timing Tc), the steering of the steering wheel in the vehicle 12 depicted in the pictorial feedback displayed on the display unit 22 is still in a partial state (a steering amount of the steering wheel in the vehicle 12 depicted in the pictorial feedback at the timing Tc has not yet reached the neutral position).

Namely, in this case also, a duration lasting both the duration T1 and the duration T2 is required for the steering of the steering wheel 36 in the remote cockpit 20 to be reflected as pictorial feedback. Thus, if the driver in the remote cockpit 20 were to see such pictorial feedback displayed on the display unit 22, the driver might want to steer the steering wheel 36 further, such that the behavior of the actual vehicle 12 would become unstable.

To address this, in the remote cockpit 20 and the remote operating system 10 according to the present exemplary embodiment, the first trajectory line 42 that is steering information for steering the steering wheel 36 and the second trajectory line 44 that is steering information regarding the actual vehicle 12 received by the communication I/F 60E are displayed on the display unit 22 as described previously, such that the driver is able to easily and accurately visually ascertain the state (movement) of the actual vehicle 12.

Figure 5:
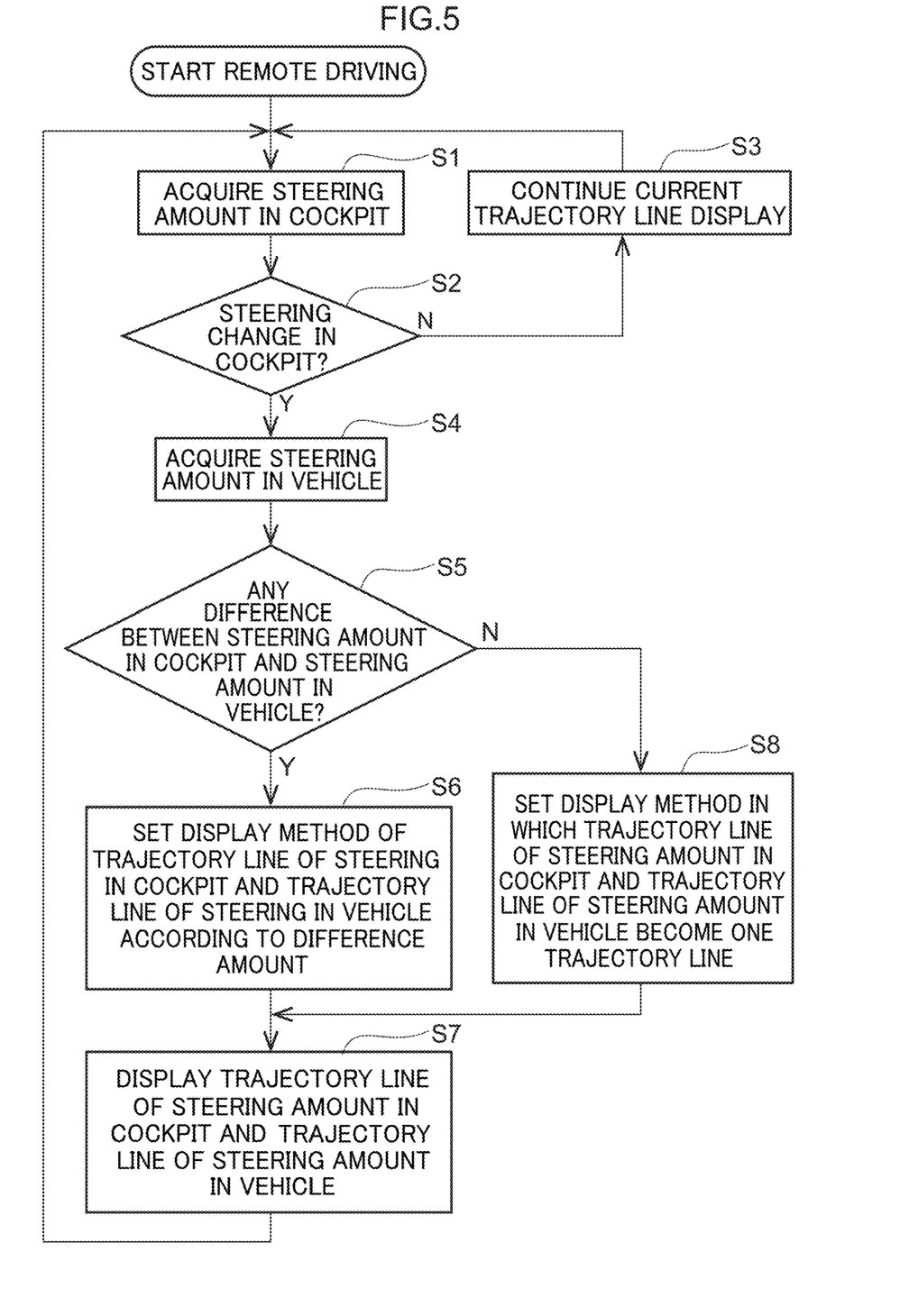
FIG. 5 is a flowchart illustrating processing processes in a remote cockpit of a remote operating system according to an exemplary embodiment.
Figure 9:
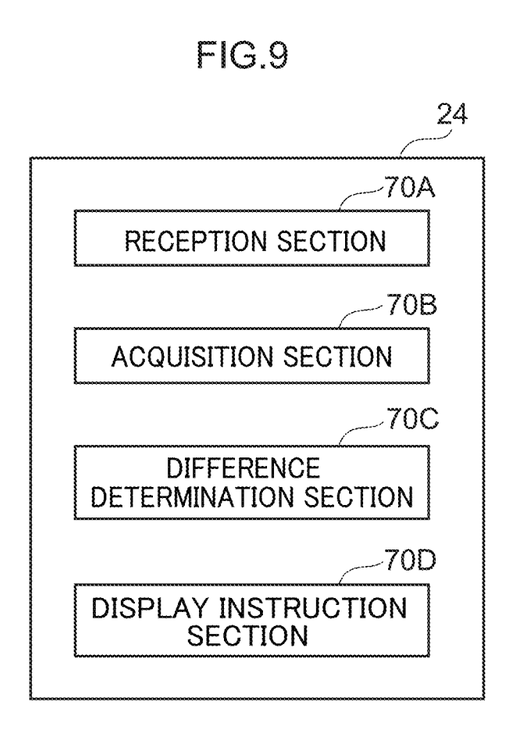
FIG. 9 is a block diagram illustrating a functional configuration of a control unit of a remote cockpit according to an exemplary embodiment.

FIG. 9 is a block diagram illustrating a functional configuration of the control unit 24. The CPU 60A executes a program stored in the ROM 60B, such that the control unit 24 functions as a reception section 70A, an acquisition section 70B, a difference determination section 70C, and a display instruction section 70D. As illustrated in FIG. 5, in the remote cockpit 20, first, the steering amount of the steering wheel 36 in the remote cockpit 20 is acquired by the control unit 24 serving as the acquisition section 70B (step S1). Namely, a determination is made as to whether or not the steering wheel 36 in the remote cockpit 20 has been steered from its neutral position (step S2).

In cases in which a determination is made that the steering wheel 36 in the remote cockpit 20 has not been steered from its neutral position (no change made), the current display of the first trajectory line 42 and the second trajectory line 44 in a straight-ahead state as illustrated in FIG. 2 on the display unit 22 is continued (step S3), and processing returns to step S1.

In cases in which a determination is made that the steering wheel 36 in the remote cockpit 20 has been steered from its neutral position (change made), the control unit 24 then serves as the acquisition section 70B to acquire the steering amount of the steering wheel in the vehicle 12 from its neutral position (step S4). When the steering wheel 36 in the remote cockpit 20 has been steered, the control unit 24 serves as the difference determination section 70C to determine whether or not there is a difference between the steering amount of the steering wheel 36 and the steering amount of the steering wheel in the vehicle 12 due to the communication lag (step S5).

When the steering wheel 36 in the remote cockpit 20 has been steered, in cases in which the control unit 24 serving as the difference determination section 70C has determined that there is a difference between the steering amount of the steering wheel 36 and the steering amount of the steering wheel in the vehicle 12, the control unit 24 serves as the display instruction section 70D to set a display method for instructing display of the position of the second trajectory line 44 on the display unit 22 with respect to the position of the first trajectory line 42 according to the amount of this difference (step S6).

In the present exemplary embodiment, as illustrated in FIG. 2 to FIG. 4, the first trajectory line 42 has been set to a thick solid line and the second trajectory line 44 has been set to a thin dashed line by either the driver or the control unit 24. Thus, as illustrated in FIG. 3 and FIG. 4, the thick solid first trajectory line 42 and the thin dashed second trajectory line 44 are respectively displayed on the display unit 22 (step S7).

Note that when the steering wheel 36 in the remote cockpit 20 has been steered, in cases in which the control unit 24 serving as the difference determination section 70C has determined that there is no difference between the steering amount of the steering wheel 36 and the steering amount of the steering wheel in the vehicle 12, the state in which the first trajectory line 42 and the second trajectory line 44 continually overlap one another is maintained, and so the control unit 24 serves as the display instruction section 70D to set a display method in which just a single (one) trajectory line trajectory line such as that illustrated in FIG. 4 is displayed on the display unit 22 (step S8).

For example, there may be a single trajectory line depicting a state in which the first trajectory line 42 and the second trajectory line 44 are overlapping one another as illustrated in FIG. 4, or a non-illustrated single trajectory line that is completely different from the first trajectory line 42 and the second trajectory line 44. The control unit 24 then serves as the display instruction section 70D to display this trajectory line on the display unit 22 (step S7). In the present exemplary embodiment, the above-described processes are repeatedly executed such that the first trajectory line 42 and the second trajectory line 44 (or a different single trajectory line) are continually displayed on the display unit 22.

Thus, even if there is a lapse between the steering timing (steering amount) by the driver in the remote cockpit 20 and the steering timing (steering amount) in the vehicle 12 that is actually traveling due to a communication lag between the remote cockpit 20 and the vehicle 12, the driver steers the steering wheel 36 by viewing the first trajectory line 42 and the second trajectory line 44 (by checking the difference between the positions of the two trajectory lines) displayed on the display unit 22, such that the driver is able to easily and accurately ascertain the movement of the actual vehicle 12 when the steering wheel 36 has been steered.

Namely, even when a communication lag with the actual vehicle 12 has occurred, the driver driving the vehicle 12 by remote operation can wait until the second trajectory line 44 overlaps the first trajectory line 42, and is thereby able to ascertain the movement of the vehicle 12. This enables the driver to be suppressed or prevented from making unnecessary steering adjustments with respect to the vehicle 12, thereby enabling the behavior of the vehicle 12 to be suppressed or prevented from becoming unstable.

Moreover, as illustrated in FIG. 2 to FIG. 4, the steering information for steering the steering wheel 36 is for example the thick solid first trajectory line 42, and the steering information regarding the actual vehicle 12 received by the communication I/F 60E of the control unit 24 serving as the reception section 70A is for example the thin dashed second trajectory line 44. The driver driving the vehicle 12 by remote operation is therefore able to intuitively easily and accurately ascertain the movement of the actual vehicle 12 when the steering wheel 36 has been steered, compared to cases in which the respective steering information is not in the form of lines.

Furthermore, the display format of the first trajectory line 42 and the second trajectory line 44 is changed in cases in which the overlap amount of the first trajectory line 42 and the second trajectory line 44 is a threshold or greater. The driver driving the vehicle 12 by remote operation is therefore able to intuitively easily and accurately ascertain the movement of the actual vehicle 12 when the steering wheel 36 has been steered, compared to cases in which the display format is not changed.

In this manner, in the remote operating system 10 and the remote cockpit 20 according to the present exemplary embodiment, the driver in the remote cockpit 20 is able to easily and accurately, and also intuitively, ascertain the state (movement) of the vehicle 12 by viewing the display unit 22, regardless of any communication lag (such as a picture transmission lag or stoppage, or a drop in resolution or frame rate).

The remote operating system 10 and the remote cockpit 20, serving as a remote operating device, according to the present exemplary embodiment, have been described above with reference to the drawings. However, the remote operating system 10 and the remote cockpit 20 according to the present exemplary embodiment are not limited to those illustrated in the drawings, and design modifications may be implemented as appropriate within a range not departing from the spirit of the present disclosure. For example, the mobile body is not limited to the vehicle 12.

Moreover, the steering information for steering the steering wheel 36 is not limited to the first trajectory line 42, and the steering information regarding the actual vehicle 12 received by the communication I/F 60E is not limited to the second trajectory line 44. The steering information for steering the steering wheel 36 and the steering information regarding the actual vehicle 12 received by the communication I/F 60E may for example take the form of numbers or the like.

Namely, using 0 when the road D is a straight line (when the steering wheel 36 is at its neutral position) as a reference, a number from 1 to 5 may be displayed on the display unit 22 so as to indicate the degree at which the road D curves. In such cases, the letter R is preferably appended to the number 1 to 5 when the road D curves toward the right, and the letter L is preferably appended to the number 1 to 5 when the road D curves toward the left.

Moreover, although an example has been described in which the processing performed by the control unit 24 is software processing performed by executing a program, there is no limitation thereto. The processing may for example be processing performed by hardware. Alternatively, the processing may be performed by a combination of both hardware and software. In cases in which the processing is software processing, the program may be stored and distributed on various types of non-transitory storage media, such as a Digital Versatile Disc (DVD), and executed by a processor such as the CPU 60A.

What is claimed is:

1. A remote operating device comprising:
   a steering unit configured to steer a mobile body;
   a display unit configured to display steering information; and
   a control unit including a memory and a processor coupled to the memory, wherein the processor is configured to:
   receive actual steering information regarding the mobile body;
   acquire steering information for steering the steering unit;
   determine a difference between the actual steering information regarding the mobile body and the steering information for steering the steering unit; and
   cause the steering information for steering the steering unit and the actual steering information regarding the mobile body to be displayed on the display unit based on the difference.

2. The remote operating device of claim 1, wherein the steering information for steering the steering unit is a first trajectory line, and the actual steering information regarding the mobile body is a second trajectory line.

3. The remote operating device of claim 2, wherein a display format of the first trajectory line and the second trajectory line is changed in a case in which an overlap amount of the first trajectory line and the second trajectory line is a threshold or greater.

4. A remote operating system comprising:
   the remote operating device of claim 1; and
   a mobile body configured to be remotely operated by the remote operating device.

5. A steering information display method for performing remote operation, the method comprising:
   by a processor:
   receiving actual steering information regarding a mobile body;
   acquiring steering information for steering a steering unit;
   determining a difference between the actual steering information regarding the mobile body and the steering information for steering the steering unit; and
   causing the steering information for steering the steering unit and the actual steering information regarding the mobile body to be displayed on a display unit based on the difference.

6. A non-transitory storage medium storing a program executable by a processor to perform steering information display processing for performing remote operation, the steering information display processing comprising:
   receiving actual steering information regarding a mobile body;
   acquiring steering information for steering a steering unit;
   determining a difference between the actual steering information regarding the mobile body and the steering information for steering the steering unit; and
   causing the steering information for steering the steering unit and the actual steering information regarding the mobile body to be displayed on a display unit based on the difference.

* * * * *